(12) United States Patent
Juriga (10) Patent No.: US 6,619,637 B1
(45) Date of Patent: Sep. 16, 2003

(54) LEAF SPRING ARRANGEMENT FOR AUTOMOTIVE VEHICLE

(75) Inventor: James Juriga, Eagle Pass, TX (US)

(73) Assignee: Rassini, S.A. de C.V., Lomas de Chapultepec (MX)

( * ) Notice: Subject to any disclaimer, the term of this patent is extended or adjusted under 35 U.S.C. 154(b) by 0 days.

(21) Appl. No.: 09/806,956

(22) PCT Filed: Oct. 5, 1999

(86) PCT No.: PCT/US99/23228
§ 371 (c)(1),
(2), (4) Date: Jul. 12, 2001

(87) PCT Pub. No.: WO00/20774
PCT Pub. Date: Apr. 13, 2000

(30) Foreign Application Priority Data

Oct. 7, 1998 (MX) .............................................. 9808284

(51) Int. Cl.[7] .................................................. F16F 1/18
(52) U.S. Cl. ...................... 267/262; 267/36.1; 267/52; 267/47; 29/896.91
(58) Field of Search ........................ 267/36.1, 260–271, 267/158–165, 42–52; 29/896.9, 896.91; 280/124.176, 124.175

(56) References Cited

U.S. PATENT DOCUMENTS

| 724,213 | A | * | 3/1903 | Smith et al. | |
| 1,621,962 | A | * | 3/1927 | Stringer | |
| 1,776,442 | A | | 9/1930 | Lessing | |
| 1,967,088 | A | * | 7/1934 | Geyer | |
| 2,192,391 | A | | 3/1940 | Weber | 267/54 |
| 3,680,850 | A | * | 8/1972 | Preddy, Jr. | |
| 4,022,449 | A | * | 5/1977 | Estorff | |
| 4,322,061 | A | * | 3/1982 | Masser | |
| 5,228,665 | A | * | 7/1993 | Berghus et al. | 267/262 |

FOREIGN PATENT DOCUMENTS

| FR | 598724 | * | 12/1925 |
| GB | 154 068 A | | 11/1920 |
| GB | 2192689 | * | 1/1988 |

* cited by examiner

Primary Examiner—Douglas C. Butler
(74) Attorney, Agent, or Firm—Raphael A. Monsanto; Benita J. Rohm (57) ABSTRACT

A suspension spring arrangement for a vehicle having an upper elongated spring leaf (12) and a lower elongated spring leaf (14) with an upper elongated spring leaf (12) is provided with a slot (22) and a lower elongated spring leaf (14) is provided with a protuberance (24). When the upper and lower spring leafs (12, 14) are joined to one another, the protuberance (24) is accommodated within the slot (22) so as to prevent lateral displacement of the upper and lower spring leafs (12, 14) with respect to each other. Pounding and squeaking noises are prevented by the installation of a polymeric insert between the slot and the protuberance. The slot (22) and the protuberance (24) are configured in accordance with square, rectangular, and/or circular shapes, depending upon the particular application. A protuberance (24) and a slot (22) can be provided at each end of the suspension spring arrangement.

9 Claims, 7 Drawing Sheets

FIG. 1

(PRIOR ART)

FIG. 2

(PRIOR ART)

FIG. 3

(PRIOR ART)

FIG. 4

(PRIOR ART)

FIG. 5

(PRIOR ART)

LEAF SPRING ARRANGEMENT FOR AUTOMOTIVE VEHICLE

REFERENCE TO OTHER APPLICATION(S)

This application has been filed in the United States Patent and Trademark Office under 35 U.S.C. §371 based on International Application No. PCT/US99/23228 having an international filing date of Oct. 5, 1999 and claiming a priority date of Oct. 7, 1998 based on Mexican Serial No. 9808284. The International Application was published pursuant to the Patent Cooperation Treaty under International Publication No. WO 00/20774 on Apr. 13, 2000 (International Publication Date).

BACKGROUND OF THE INVENTION

1. Field of the Invention

This invention relates generally to springs used in automotive suspension systems, and more particularly, to springs for use in the rear suspension system of a vehicle.

2. Description of the Related Art

Springs that are presently in use in the suspension systems of vehicles are formed of two parallel elongated sheets, or leafs, manufactured of spring steel, such as SAE 5160, 6150, JSAE SUP 9, and are of the type that are centrally joined by a bolt or a retaining clamp that is installed near one of the ends of the spring. The bolt functions to keep the two spring leafs in joined condition, while the retaining clamp avoids the spring leafs from becoming laterally displaced with respect to each other, whereupon the ability of the springs to support the vehicle would be diminished. In addition, such lateral displacement of the springs may result in one of the spring leafs hitting a part of the vehicle, such as a hose or the gas tank, creating a dangerous condition during the use of the vehicle. Placement of the retaining clamp is effected upon fixing same with a rivet to one of the spring leafs, placing thereon a series of inserts, and closing the rivet with the use of a press or a hammer or mallet. Clearly, the installation of the retaining clamp is a labor intensive operation that requires adherence to dimensional and tolerance specifications.

In view of the foregoing, it is an object of this invention to eliminate the use of a retaining clamp for maintaining the lateral edges of two spring leafs parallel and in alignment.

It is also an object of this invention to eliminate the need for a retaining clamp while nevertheless achieving a comfortable ride in the vehicle as the vehicle is operated over holes and bumps.

It is another object of this invention to provide a spring having resistance, capacity, and durability characteristics that remain similar to those of known springs.

It is still another object of this invention to provide a spring arrangement that affords savings in labor and material by eliminating the need for a conventional retaining clamp.

SUMMARY OF THE INVENTION

The foregoing and other objects are achieved by this invention which provides, in accordance with a first apparatus aspect thereof, a suspension spring arrangement for a vehicle. The suspension spring arrangement is of the type having an upper elongated spring leaf, a lower elongated spring leaf, and clamping bolt or other fastener disposed in central area of the upper and lower elongated spring leafs. The clamping bolt joins the upper and lower elongated spring leafs to each other. In accordance with the invention, there is provided a slot arranged in the vicinity of an end of the upper elongated spring leaf. A protuberance that is formed near an end of the lower elongated spring leaf is formed of a portion of the lower elongated spring leaf itself. The protuberance is defined by a cut in the lower elongated spring leaf and the material defined thereby is bent so as to be directed substantially orthogonal to a surface of the lower elongated spring leaf. The protuberance is disposed to be accommodated within the slot of the upper elongated spring leaf so as to prevent lateral displacement of the upper and lower elongated spring leafs with respect to each other.

In one embodiment of this first aspect of the invention, there is provided an insert that is disposed between the slot and the protuberance for avoiding impact and squeaking noises. The insert may be formed of a polymeric material, such as nylon, Teflon®, polyethylene, and polyurethane.

In other embodiments of the invention, the protuberance and/or the slot is configured in a variety of selectable shapes, depending upon the use that is made of the suspension spring arrangement. For example, the slot and protuberance may be configured to have square, rectangular, and/or circular configurations.

In accordance with a further apparatus aspect of the invention, there is provided a suspension spring arrangement for a vehicle, the suspension spring arrangement being of the type having an upper elongated spring leaf, a lower elongated spring leaf, and a clamping bolt disposed in a central area of the upper and lower elongated spring leafs, whereby such spring leafs are joined to one another. In accordance with the further aspect of the invention, there is provided a first slot disposed near a first end of the upper elongated spring leaf, and a second slot disposed near a second end of the same spring leaf. A first protuberance is formed near a first end of a lower elongated spring leaf, the first protuberance being formed of a first portion of the lower elongated spring leaf that is defined by a first cut and a corresponding portion thereof is directed substantially orthogonal to the lower elongated spring leaf. Similarly, a second protuberance is formed near a second end of the lower elongated spring leaf. When the upper and lower elongated spring leafs are joined to one another, the first protuberance is disposed to be accommodated within the first slot of the upper elongated spring leaf Similarly, in other embodiments, the second protuberance is accommodated within the second slot of the upper elongated spring leaf.

In one embodiment of this further aspect of the invention, there is provided a first insert disposed between the first slot and the first protuberance. As previously noted, such an insert eliminates impact and squeaking noises between the first slot and the first protuberance. In similar manner, a second insert is disposed between the second slot and the second protuberance. Also, as previously noted, the first and second slots, and the first and second protuberances, are configured in accordance with selectable ones of square, rectangular, and circular shapes.

In accordance with a method aspect of the invention, there are provided the steps of:

punching at least one slot near an end of a first spring leaf (12);

forming a protuberance near an end of a second spring leaf (14) by forming a partial cut and folding a portion of the second spring leaf (14) to be substantially orthogonal to the second spring leaf (14); and joining the first and second spring leafs at respective central portions thereof with a fastener whereby the protuberance of the second spring leaf (14) is accommodated within the slot of the first spring leaf (12). In this manner, lateral displacement of the first and second spring leafs with respect to each other is precluded.

In one embodiment of this method aspect of the invention, there is provided the further step of installing an insert between the protuberance of the second spring leaf and the slot of the first spring leaf. In one embodiment, the installation of such an insert is performed before performing the step of joining the first and second spring leafs to one another.

BRIEF DESCRIPTION OF THE DRAWING

Comprehension of the invention is facilitated by reading the following detailed description, in conjunction with the annexed drawing, in which.

DETAILED DESCRIPTION

Figure 1:
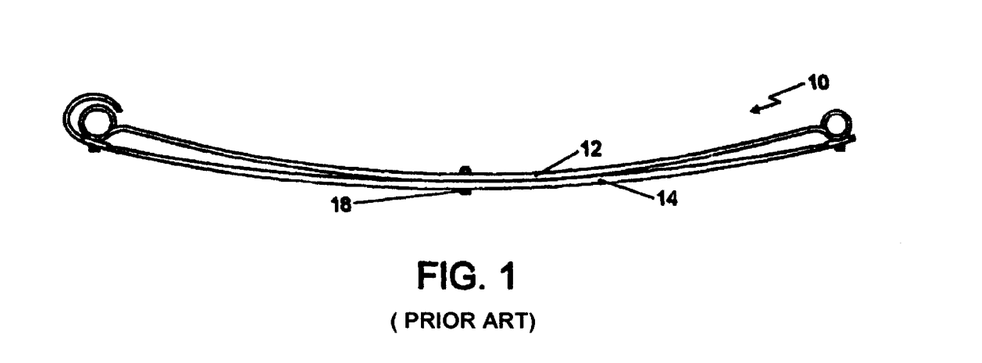
FIG. 1 is a side view of a known prior art automotive vehicle spring assembly.

FIG. 1 is side representation of a prior art spring assembly 10 for use in automotive vehicle suspension systems (not shown). As shown, there is provided an elongated spring leaf 12, a lower elongated spring leaf 14, and a rivet 16 at the center of spring leafs 12 and 14. The clamp rivet maintains the spring leafs joined to one another.

Figure 2:
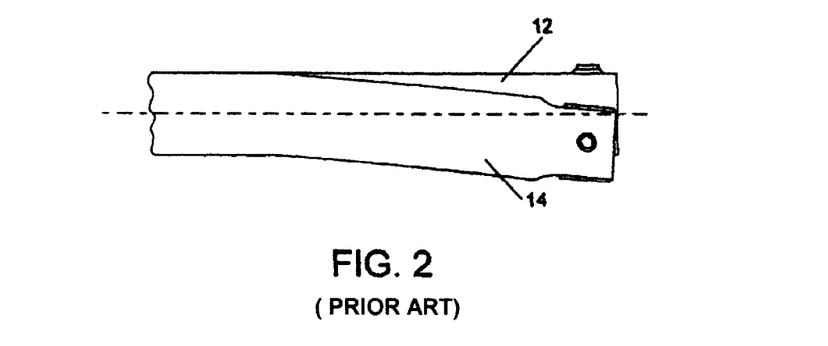
FIG. 2 is an enlarged view of a portion of the prior art spring assembly of FIG. 1.

FIG. 2 is an enlarged view of a portion of the known spring assembly 10 of FIG. 1, showing the lateral displacement between spring leafs 12 and 14 that occurs during the use of the vehicle (not shown).

Figure 3:
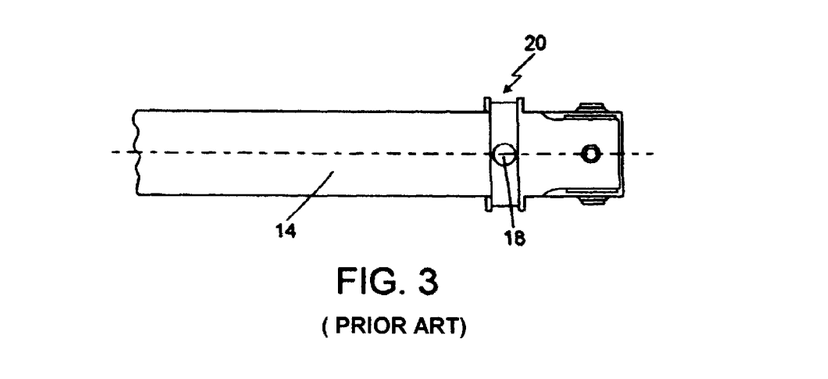
FIG. 3 is an enlarged view of a portion of the prior art spring assembly of FIG. 1, specifically including a retaining clamp.

FIG. 3 is a plan view of the known arrangement shown in FIG. 2, further showing a retaining clamp 20 that prevents lateral or pivotal displacement between spring leafs 12 and 14.

Figure 4:
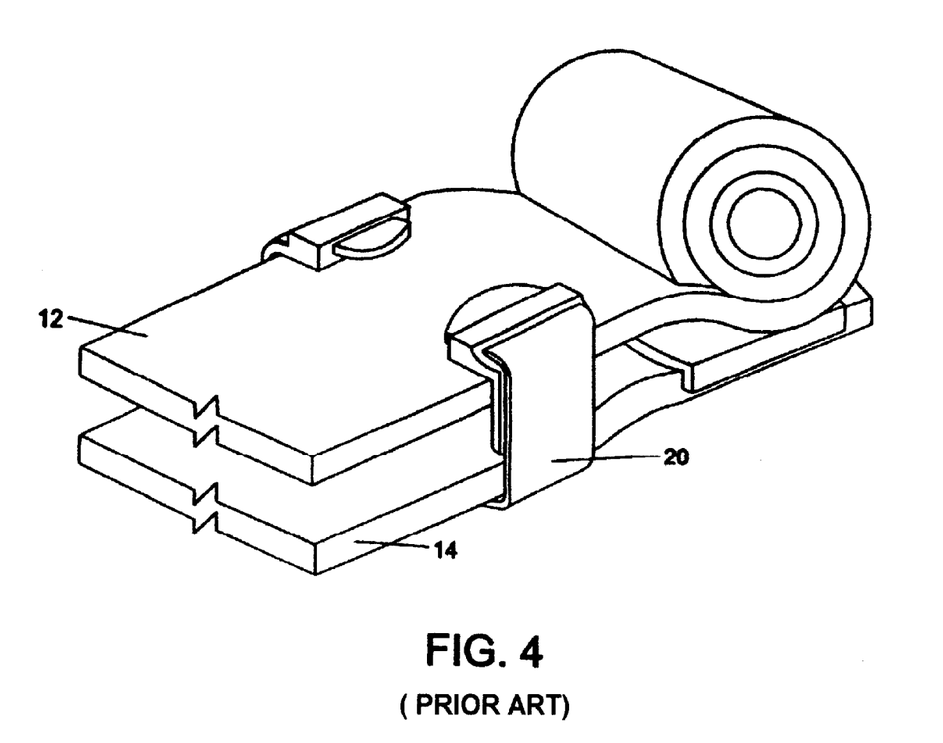
FIG. 4 is a perspective representation of a portion of the prior art spring assembly of FIG. 1 showing a retaining clamp.

FIG. 4 is an enlarged perspective representation of a spring leaf assembly, specifically spring leaf assembly 10, wherein retaining clamp 20, as previously described hereinabove with respect to FIG. 3, maintains elongated spring leafs 12 and 14 in parallel relation to one another. In this manner, the retaining clamp, precludes displacement of the spring leafs with respect to one another, in the manner described hereinabove with respect to FIG. 2.

Figure 5:
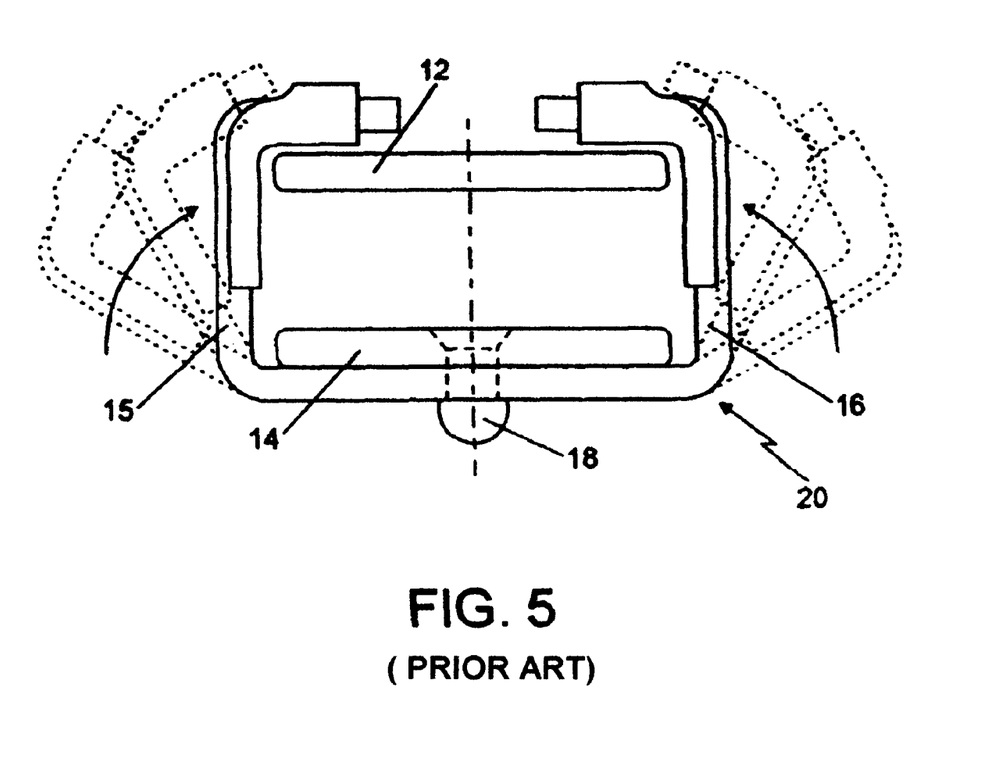
FIG. 5 is a partially cross-sectional front view of a spring assembly showing a prior art retaining clamp that can be deployed in place on the spring assembly.

FIG. 5 is a partially cross-sectional representation that is useful to describe the installation process of retaining clamp 20 on elongated spring leafs 12 and 14. As shown in this figure, the retaining clamp communicates with spring leaf 14 and is fixed thereto by a rivet 18. Initially, lateral walls 15 and 16 of retaining clamp 20 are arranged in an open position, and once the retaining clamp is secured to spring leaf 14, walls 15 and 16 are closed in the direction shown by the arrows by the use of a press (not shown) or a mallet (not shown).

Figure 6:
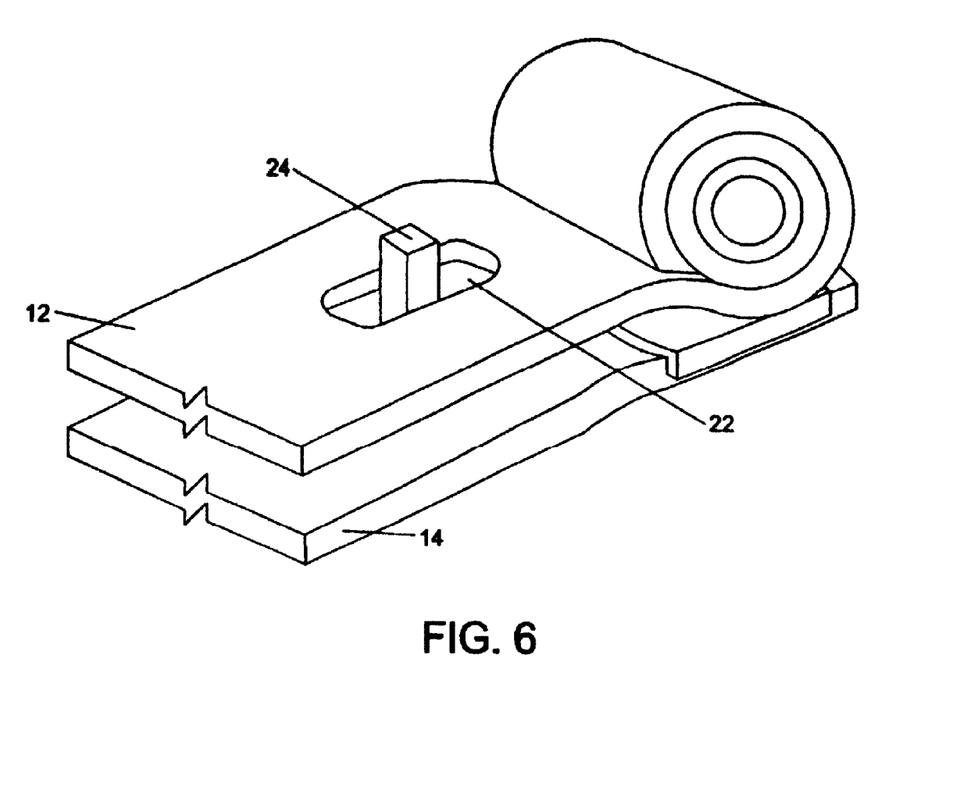
FIG. 6 is a perspective representation of a spring assembly constructed in accordance with the principles of the invention.
Figure 7:
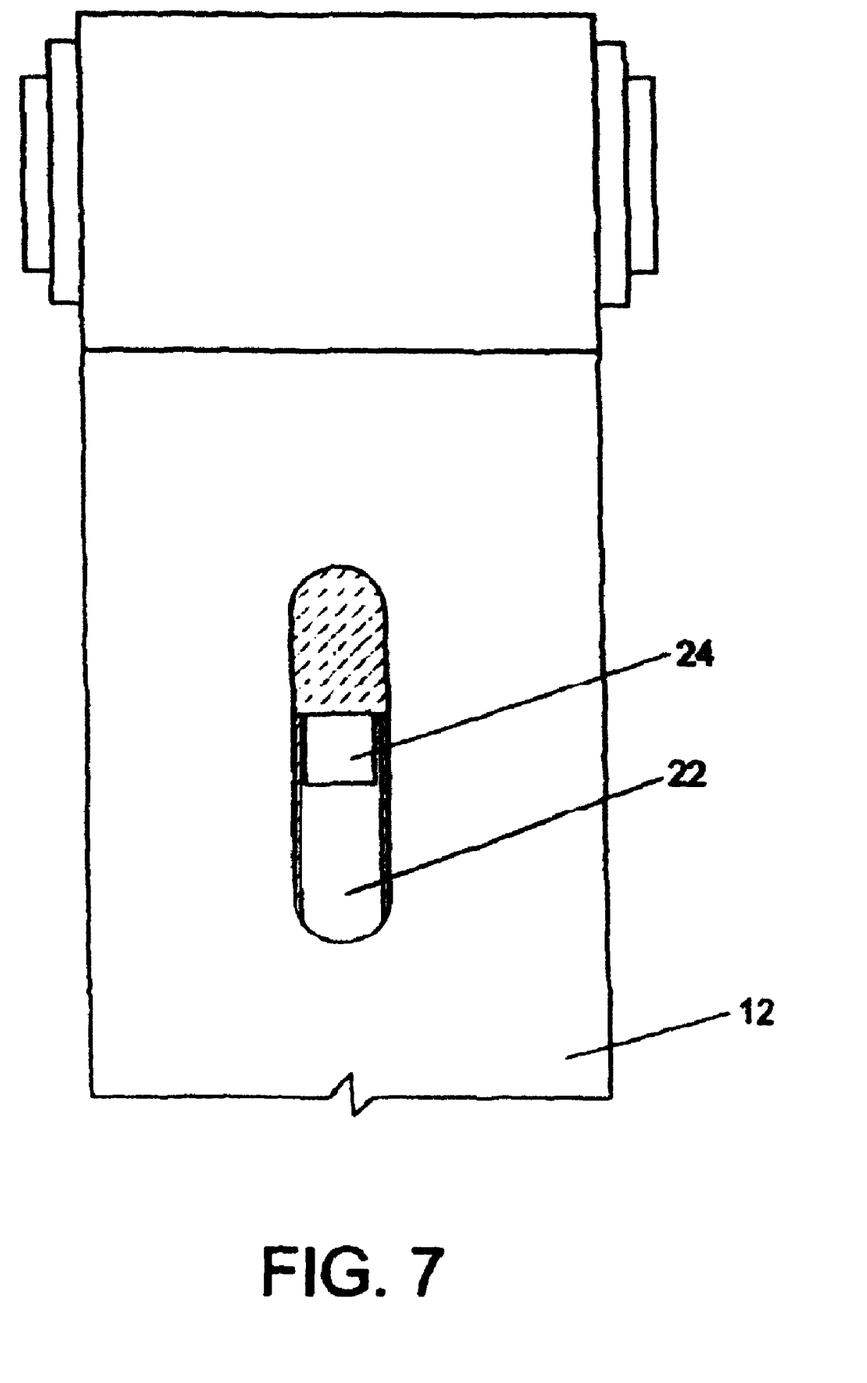
FIG. 7 is a plan view of a portion of the spring assembly of FIG. 6.
Figure 8:
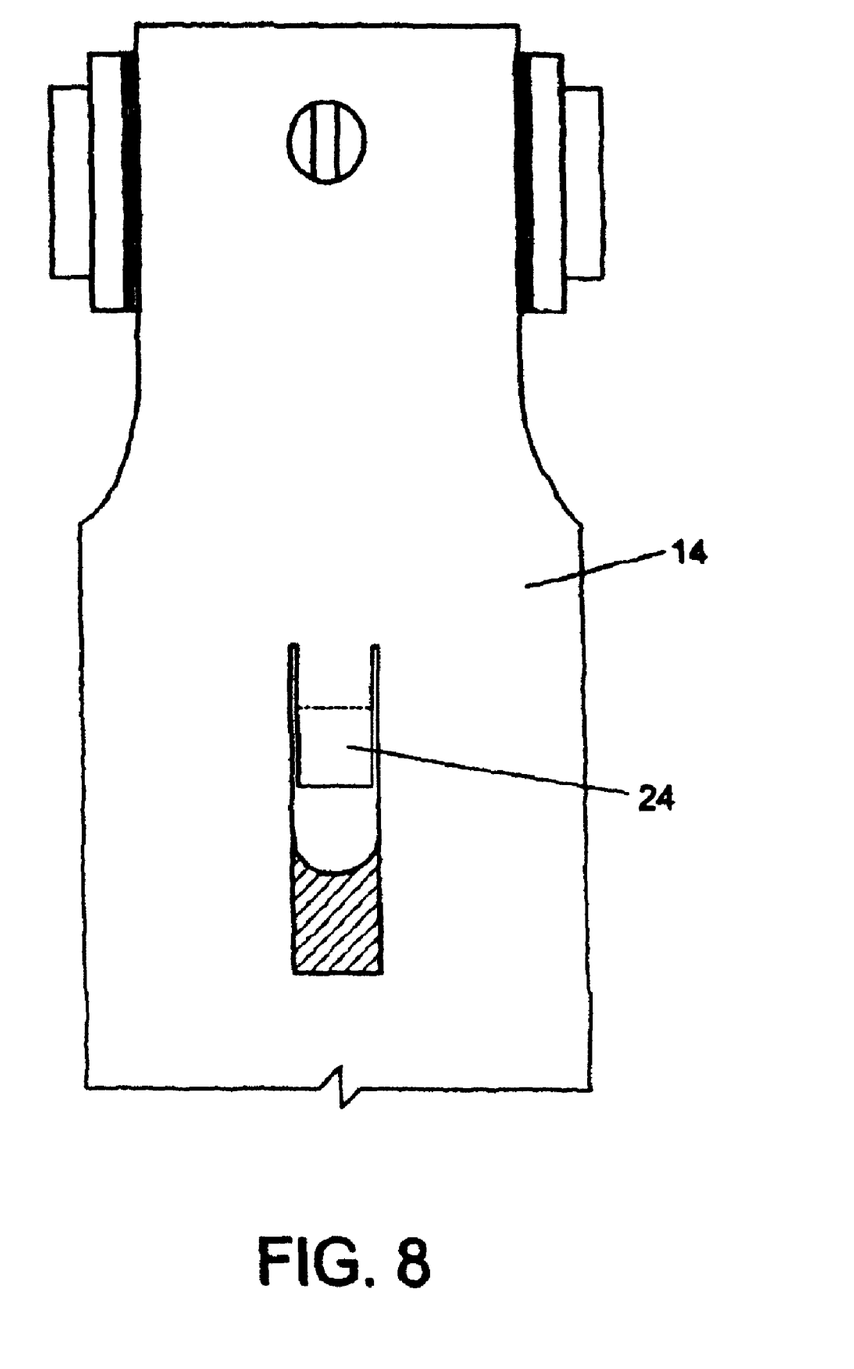
FIG. 8 is an underside plan view of a section of the spring assembly of the present invention.
Figure 9:
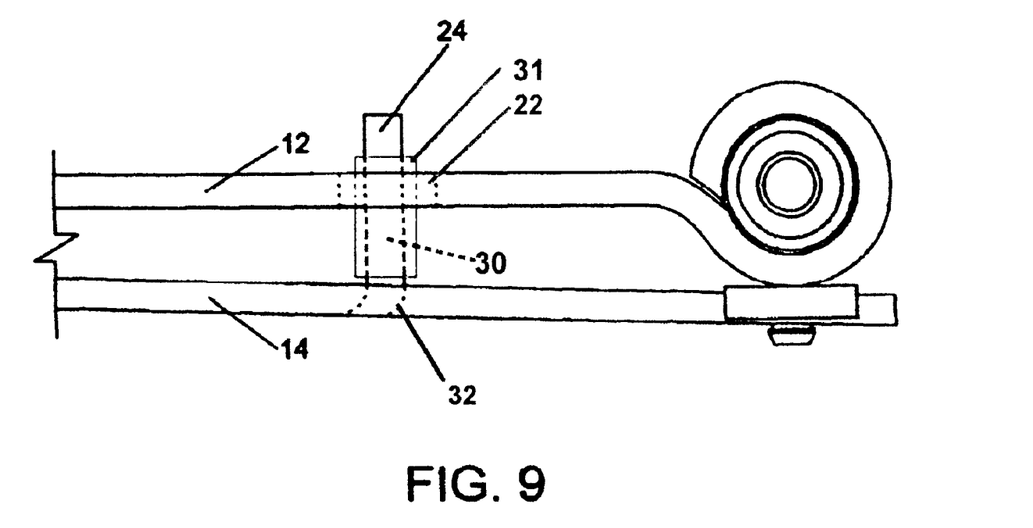
FIG. 9 is a side view of a portion of the spring assembly of the present invention showing a schematic illustration of an insert interposed between the slot and the protuberance.

FIGS. 6–9 illustrate a spring section constructed in accordance with the invention. More specifically, it is evident from the figures that the arrangement of the invention does not employ a retaining clamp, such as retaining clamp 20 described hereinabove. FIG. 6 shows a preferred embodiment of the invention wherein there is provided a slot 22 near one end of spring leaf 12. In this embodiment, a section 30 (FIG. 9) of spring leaf 14 is cut and folded upward near one of the ends of spring leaf 14 so as to produce an upward protuberance 24. The upward protuberance is accommodated within slot 22 of spring leaf 12 and serves to prevent lateral displacement between spring leafs 12 and 14. In this manner, spring leafs 12 and 14 are maintained substantially fixed in lateral and pivotal relation to one another. An upward bend 32 of section 30 is shown in FIG. 9.

In the practice of this specific illustrative embodiment of the invention, the length of slot 22 along the axial direction of spring leaf 12 is determined by the separation distance between spring leafs 12 and 14, which inter-spring leaf distance is determined in response to the designed suspension travel of the vehicle. The width of slot 22 is determined in response to the expected lateral load. In addition, in determining the length and width of the slot, consideration should be given to combined and accumulated design tolerances to facilitate assembly of the spring and to minimize impact forces.

In accordance with a second aspect of the invention, spring leaf 10 is provided with a slot 22 and protuberance 24 at each of its ends.

In accordance with a still further aspect of the invention, there is provided a method of manufacturing and assembling a leaf spring arrangement for a vehicle. The method includes the steps of:

punching one or two slots at respective ends of spring leaf 12 of spring leaf assembly 10;

making a corresponding number of partial cuts near the ends of spring leaf 14 so as to permit same to be folded along one or two edges in an upward direction;

joining spring leafs 12 and 14 at the central region with a rivet or like fastening arrangement whereby such a protuberance 24 from spring leaf 14 is disposed within one of the slots through spring leaf 12;

whereupon, lateral displacement of spring leafs 12 and 14 relative to one another is avoided.

In accordance with a further embodiment of the invention, there may be provided one or more inserts, such as insert 31 (shown schematically in FIG. 9), formed of materials such as nylon, Teflon®, polyethylene, polyurethane, etc. between slot 22 and protuberance 24. Such inserts would reduce the effects of pounding between spring leafs 12 and 14, as well as reducing squeaking.

In addition to the foregoing, it is within the scope of the present invention that slot 22 and protuberance 24 may be configured to have different shapes than those presented herein. Such alternative shapes would be responsive to the use to which the spring assembly is applied. More specifically, the protuberance can be configured to be square, rectangular, circular, or any other appropriate configuration, and the corresponding slot would be configured to accommodate therein such a protuberance.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A suspension spring arrangement for a vehicle, the suspension spring arrangement having an upper elongated spring leaf (12) and a lower elongated spring leaf (14), the suspension spring arrangement comprising:

a clamping bolt disposed in a central area of the upper elongated spring leaf (12) and the lower elongated spring leaf (14) to join the upper and lower elongated spring leaves to each other;

a slot (22) disposed between the central area and an end of the upper elongated spring leaf (12); and a protuberance (24) formed between the central area and an end of the lower elongated spring leaf (14), said protuberance being formed of a portion of lower elongated spring leaf (14) that is defined by a cut and directed substantially orthogonal to the lower elongated spring leaf (14);

wherein the protuberance (24) is disposed to be accommodated within the slot (22) of upper elongated spring leaf (12) for preventing lateral displacement, and permitting longitudinal displacement, of the upper and lower elongated spring leaves with respect to each other.

2. The suspension spring arrangement of claim 1, wherein there is further provided an insert disposed between said slot (22) and said protuberance (24) for avoiding impact and squeaking noises between said slot and said protuberance.

3. The suspension spring arrangement of claim 1, wherein said slot (22) and said protuberance (24) are configured in accordance with selectable ones of square, rectangular, and circular configurations.

4. A suspension spring arrangement for a vehicle, the suspension spring arrangement having an upper elongated spring leaf (12), and a lower elongated spring leaf (14), the suspension spring arrangement comprising:

a clamping bolt disposed in a central area of the upper elongated spring leaf (12) and the lower elongated spring leaf (14) to join the upper and lower elongated spring leaves to each other;

a first slot (22) disposed between the central area and a first end of the upper elongated spring leaf (12);

a second slot disposed between the central area and a second end of the upper elongated spring leaf (12);

a first protuberance (24) formed between the central area and a first end of a lower elongated spring leaf (14), said first protuberance being formed of a first portion of the lower elongated spring leaf (14) that is defined by a first cut and directed substantially orthogonal to the lower elongated spring leaf (14); and a second protuberance formed between the central area and a second end of the lower elongated spring leaf (14), said second protuberance being formed of a second portion of lower elongated spring leaf (14) that is defined by a second cut and directed substantially orthogonal to the lower elongated spring leaf (14);

wherein said first protuberance (24) is disposed to be accommodated within said first slot (22) of upper elongated spring leaf (12) for preventing lateral displacement, and permitting longitudinal displacement, of the upper and lower elongated spring leaves with respect to each other.

5. The suspension spring arrangement of claim 4, wherein there are further provided:

a first insert disposed between said first slot (22) and said first protuberance (24) for avoiding impact and squeaking noises between said first slot (22) and said first protuberance (24); and a second insert disposed between said second slot (22) and said second protuberance (24) for avoiding impact and squeaking noises between said second slot (22) and said second protuberance.

6. The suspension spring arrangement of claim 4, wherein said first and second slots and said first and second protuberances are configured in accordance with selectable ones of square, rectangular, and circular configurations.

7. A method of manufacturing and assembling a suspension spring for a vehicle, the method comprising the steps of:

punching at least one slot between a central region and an end of a first spring leaf (12);

forming a protuberance between a central region and an end of a second spring leaf (14) by forming a partial cut and folding a portion of the second spring leaf (14) to be substantially orthogonal to the second spring leaf (14); and joining the first and second spring leaves at the respective central regions thereof with a fastener, whereby the protuberance of the second spring leaf (14) is accommodated within the slot of the first spring leaf (12);

whereby lateral displacement of the first and second spring leaves with respect to each other is precluded, and longitudinal displacement of the first and second spring leaves with respect to each other is permitted.

8. The method of claim 7, wherein there is further provided the step of installing an insert between the protuberance of the second spring leaf (14) and the slot of the first spring leaf (12).

9. The method of claim 8, wherein said step of installing is performed before performing said step of joining.

* * * * *